United States Patent
Colson et al.

(10) Patent No.: US 11,300,360 B2
(45) Date of Patent: Apr. 12, 2022

(54) PRESSURE VESSEL WITH BARRIER PASSAGE CONTAINING FIRE SUPPRESSANT ELEMENTS

(71) Applicant: Hamilton Sundstrand Corporation, Charlotte, NC (US)

(72) Inventors: Paul M. Colson, Westfield, MA (US); Eric Surawski, Hebron, CT (US); Murtuza Lokhandwalla, South Windsor, CT (US); Thomas James Killen, West Hartford, CT (US); Raffi O. Mangoyan, Manchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 196 days.

(21) Appl. No.: 16/751,955

(22) Filed: Jan. 24, 2020

(65) Prior Publication Data
US 2021/0231380 A1    Jul. 29, 2021

(51) Int. Cl.
*F28D 7/10*    (2006.01)
*F28D 7/00*    (2006.01)

(52) U.S. Cl.
CPC .............. *F28D 7/106* (2013.01); *F28D 7/005* (2013.01); *F17C 2203/068* (2013.01); *F17C 2203/0626* (2013.01); *F28F 2265/00* (2013.01)

(58) Field of Classification Search
CPC ...... F28D 7/106; F28D 7/005; F28F 2265/00; F28F 1/003; F17C 2203/0626; F17C 2203/068
See application file for complete search history.

(56) References Cited

U.S. PATENT DOCUMENTS

| | | | |
|---|---|---|---|
| 492,358 A | 2/1893 | Edwin | |
| 2,687,618 A | 8/1954 | Bergstrom | |
| 4,177,863 A | 12/1979 | Simon | |
| 5,140,821 A * | 8/1992 | Fauske | F17C 13/026 220/746 |
| 8,943,827 B2 * | 2/2015 | Prociw | F01D 25/12 60/736 |
| 10,221,768 B2 * | 3/2019 | Agg | F28D 7/10 |
| 2010/0018673 A1 * | 1/2010 | Yang | F16L 39/00 165/104.19 |

(Continued)

FOREIGN PATENT DOCUMENTS

| DE | 3128497 A1 | 2/1983 |
|---|---|---|
| DE | 3300523 A1 | 7/1984 |

(Continued)

OTHER PUBLICATIONS

Extended European Search Report dated Jun. 16, 2021, received for corresponding European Application No. 21152522.5, 11 pages.

*Primary Examiner* — Jon T. Schermerhorn, Jr.
(74) *Attorney, Agent, or Firm* — Kinney & Lange, P.A.

(57) ABSTRACT

A pressure vessel includes a first wall defining a container and a second wall surrounding the container defining a cavity between the first wall and the second wall. The pressure vessel also includes a vent in the second wall providing fluid communication between the cavity and an outside of the second wall and matter positioned within the cavity configured to prevent flame from propagating through the cavity while providing thermal conductivity between the first wall and the second wall.

13 Claims, 4 Drawing Sheets

(56) References Cited

U.S. PATENT DOCUMENTS

| | | | |
|---|---|---|---|
| 2011/0023519 A1* | 2/2011 | Dong | A23G 9/14 |
| | | | 62/340 |
| 2011/0036544 A1* | 2/2011 | Shirai | E03D 9/08 |
| | | | 165/95 |
| 2014/0110095 A1* | 4/2014 | Chang | F28F 1/40 |
| | | | 165/181 |
| 2016/0290738 A1* | 10/2016 | Kupiszewski | F28F 13/12 |
| 2018/0038654 A1 | 2/2018 | Popp et al. | |
| 2018/0073811 A1 | 3/2018 | Taras et al. | |
| 2019/0226404 A1 | 7/2019 | Bellis | |

FOREIGN PATENT DOCUMENTS

| | | |
|---|---|---|
| DE | 19721111 A1 | 11/1997 |
| EP | 2256067 A1 | 12/2010 |
| FR | 2509030 A1 | 1/1983 |
| JP | 07190651 A | 7/1995 |
| JP | 2008274426 A | 11/2008 |

* cited by examiner

PRESSURE VESSEL WITH BARRIER PASSAGE CONTAINING FIRE SUPPRESSANT ELEMENTS

BACKGROUND

The present disclosure relates to double-walled pressure vessels, and in particular, to fire suppression in double-walled pressure vessels.

Pressure vessels often hold hazardous fluids that could contaminate external environments or adjacent circuits if the fluids were to leak out of the pressure vessels. Pressure vessels can be damaged over time by steady and cyclic loads due to temperature changes, vibration, pressure, and acceleration. Manufacturing or material defects, corrosion, and wear from fluid abrasion in high-stress areas may also cause leaks to develop over time. Some pressure vessels incorporate a double-walled design to isolate leaks. A double-walled pressure vessel is created by placing a primary pressure vessel inside of a secondary pressure vessel with a barrier layer in-between. The barrier layer is an empty volume at the pressure of the exterior environment. The barrier layer isolates the leak so the fluid leaking from the pressure vessel can be safely drained and damage can be identified before any leakage occurs into an external environment or adjacent fluid circuit.

SUMMARY

In one embodiment, a pressure vessel includes a first wall defining a container and a second wall surrounding the container defining a cavity between the first wall and the second wall. The pressure vessel also includes a vent in the second wall providing fluid communication between the cavity and an outside of the second wall and matter positioned within the cavity configured to prevent flame from propagating through the cavity while providing thermal conductivity between the first wall and the second wall.

In another embodiment, a pressure vessel includes a first system. The first system includes a first container, a second container surrounding the first container, and a barrier space extending between the first container and the second container. The first system also includes a plurality of fire suppression elements extending between the first container and the second container, a vent, and a barrier passage. The barrier passage is defined by the plurality of fire suppression elements, and the barrier passage is fluidically connected to the vent.

In another embodiment, a method of making includes forming a first wall, where the first wall defines a container, forming fire suppression elements on the surface of the first wall, and forming a second wall surrounding the container and defining a cavity between the first wall and the second wall. The fire suppression elements are configured to prevent flame from propagating through the cavity while providing thermal conductivity between the first wall and the second wall.

Figure 1:
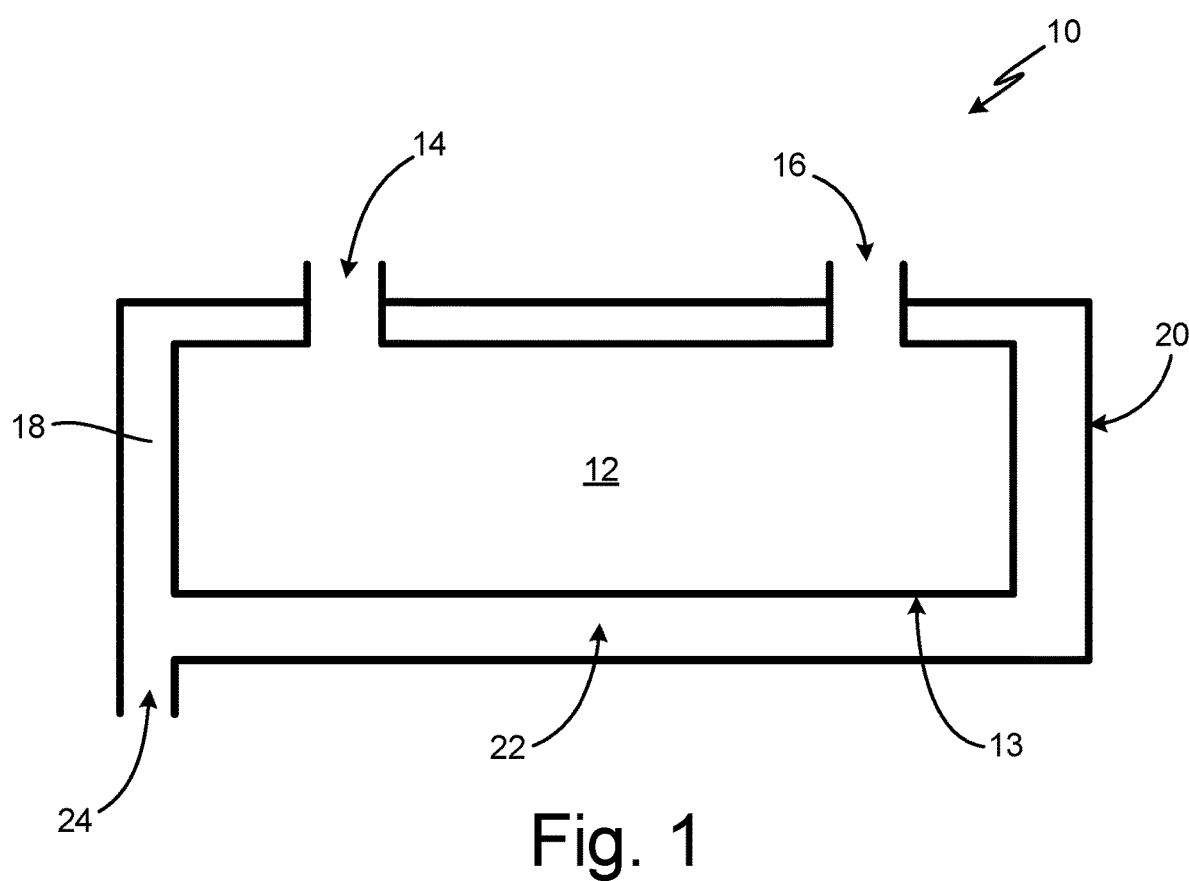
FIG. 1 is a schematic diagram of a pressure vessel system.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The disclosure relates to a pressure vessel system with a barrier cavity or barrier space. The barrier cavity surrounds the pressure vessel to act as a buffer between the combustible or hazardous material inside the pressure vessel and the reactant agents of the earth's atmosphere. The barrier cavity includes fire suppression elements that help mitigate the likelihood of combustion upon a leak, aid in heat transfer, and provide structural support to the pressure vessel. The pressure vessel system with a barrier passage containing fire suppression elements will be described below with reference to FIGS. 1-4.

FIG. 1 is a schematic view of pressure vessel system 10. Pressure vessel system 10 includes pressure vessel or container 12, container wall 13, inlet 14, outlet 16, and barrier layer 18. Barrier layer 18 includes barrier wall 20, barrier cavity or space 22, vent 24, and matter or fire suppression elements 32 (shown in FIGS. 3 and 4 below).

Container 12 fluidically connects inlet 14 and outlet 16. Container 12 can be a storage tank, process vessel, heat exchanger, or any other suitable pressure vessel used to store solid, liquid, or gaseous materials. Container 12 can be made out of nickel alloys, ceramics, carbon alloys, or any other suitable material. Container 12 can be one solid body or multiple bodies joined together to form an airtight container.

Pressure vessel system 10 is a double-walled pressure vessel where barrier wall 20 encompasses container 12. Barrier layer 18 is formed between container wall 13 and barrier wall 20. Fire suppression elements 32 extend from container 12 to barrier wall 20. Fire suppression elements 32 form passageways 34 (shown in FIGS. 3 and 4A-4F below). Barrier layer 18 is fluidically connected to vent 24. In the embodiment of FIG. 1, vent 24 is fluidically connected to atmosphere. In other embodiments that are not shown, vent 24 can be connected to a check valve or other piping that routes through a thermal oxidizer or other air handling system. In other embodiments not shown, vent 24 may include a leak detection sensor to detect a leak from container 12. The leak detection sensor can be a relief valve and pressure sensor, an accumulator and a position sensor, or any other suitable leak detection sensor.

During the operation of pressure vessel 10, a processing material goes into container 12 through inlet 14. The processing material can be pumped, dumped, poured, or any other suitable method of filling container 12. Container 12 can then be pressurized to supply the processing material to a processing line or to act as a heat exchanger for a system. The processing material then leaves container 12 through outlet 14. If a leak forms in container wall 13, the processing material leaking from container 12 flows into barrier layer 18. Barrier layer 18 is designed to contain the leaked processing material and fire suppression elements 32 (shown in FIGS. 3 and 4A-4F) direct the leaked processing material through passageways 34 toward atmosphere, limiting the leaked processing material's exposure to the atmosphere. Fire suppression elements 32 and passageways 34 are designed to increase the flow resistance of the leaked processing material in passageways 34 and as a result, prevent the leaked material from spreading quickly.

Figure 2A:
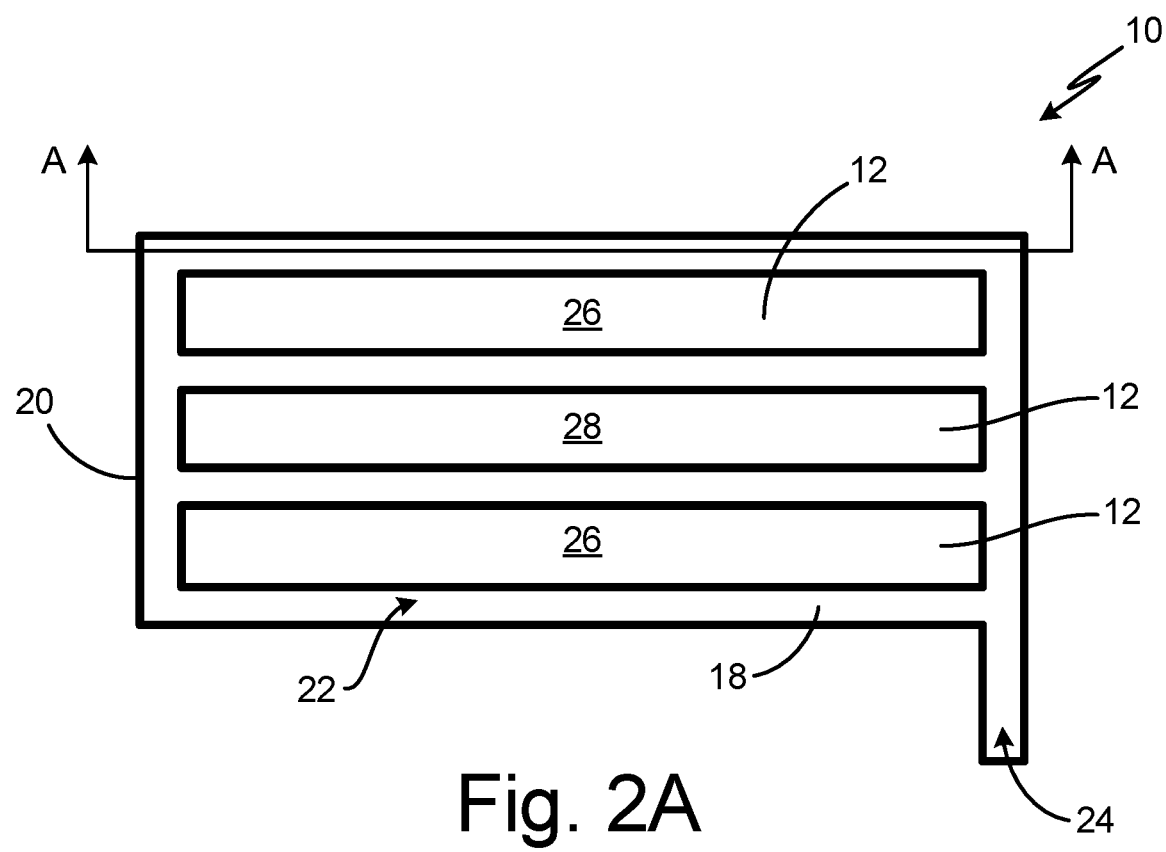
FIG. 2A is a schematic diagram of another embodiment of a pressure vessel system.

FIG. 2A is a schematic diagram of another embodiment of pressure vessel system 10. In the embodiment of FIG. 2A, container 12 includes heat exchanger 26 and heat exchanger 28. Hot fluid flows through heat exchanger 26 and cold fluid flows through heat exchanger 28. Barrier layer 18 fully encompasses both heat exchanger 26 and heat exchanger 28. Fire suppression elements 32 (shown in FIGS. 3 and 4A-4F) span barrier space 22 to thermally connect and assist in the heat transfer between heat exchanger 26 and heat exchanger 28. To increase the heat transfer between heat exchanger 26 and heat exchanger 28, fire suppression elements 32 can be made from silver, copper, gold, aluminum, titanium, or any other suitable material with high thermal conductivity.

During operation, if either heat exchanger 26 or heat exchanger 28 developed a leak, the fluid of heat exchanger 26 and/or the fluid of heat exchanger 28 would flow into barrier layer 18. Barrier layer 18 is designed to contain the leaked fluid and fire suppression elements 32 (shown in FIGS. 3 and 4A-4F) direct the leaked fluid through passageways 34 (shown in FIGS. 3 and 4A-4F), limiting the leaked fluid's exposure to the atmosphere. Fire suppression elements 32 and passageways 34 are designed to increase the flow resistance of the leaked fluid and as a result, prevent the leaked material from spreading quickly. Furthermore, in the scenario that the leaked fluid is flammable, passageways 34 and barrier cavity 22 form enclosed serpentine pathways between the atmosphere and a location of the leak that reduces the ability of the leaked fluid to mix with enough oxygen from the atmosphere to cause significant risk of combustion.

Figure 2B:
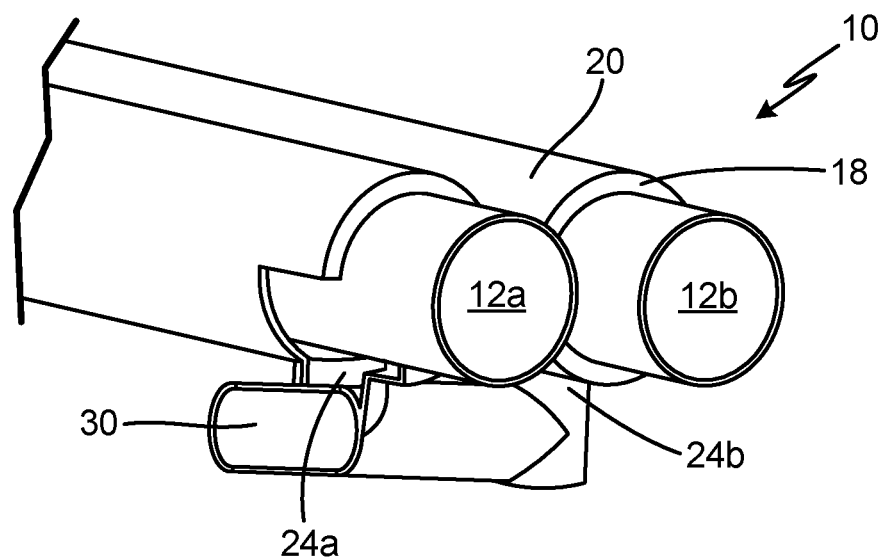
FIG. 2B is a partially-sectioned perspective view of a pressure vessel system.

FIG. 2B is a partially-sectioned perspective view of pressure vessel system 10. In the embodiment of FIG. 2B, container 12 comprises at least two tubes (tube 12a and tube 12b as shown in FIG. 2B). Barrier layer 18 is formed around container 12 by barrier wall 20. Fire suppression elements 32 (shown in FIGS. 3 and 4A-4F) extend from container 12 to barrier wall 10 inside barrier layer 18. Fire suppression elements 32 form passageways 34 (shown in FIGS. 3 and 4A-4F). Barrier layer 18 forms a barrier space between barrier wall 20 and container 12. The barrier space is fluidically connected to vent 24. In the embodiment of FIG. 2B, vent 24a is fluidically connected to barrier layer 18 surrounding tube 12a. Barrier layer 18 surrounding tube 12b also includes vent 24b. Vent 24a and vent 24b are fluidically connected to central collection point 30. Central collection point 30 is the point at which the vent 24a and vent 24b converge at a distance away from container 12. Central collection point 30 increases the buffer between potential leaks and atmospheric gases. The buffer between leaks and atmosphere helps mitigate the likelihood of combustion. In the embodiment of FIG. 2B, central collection point 30 is fluidically connected to the atmosphere. In another embodiment, collection point 30 may comprise a pressure relief valve, a backflow prevention valve, and/or a sensor configured to detect leaking material from container 12.

Figure 3:
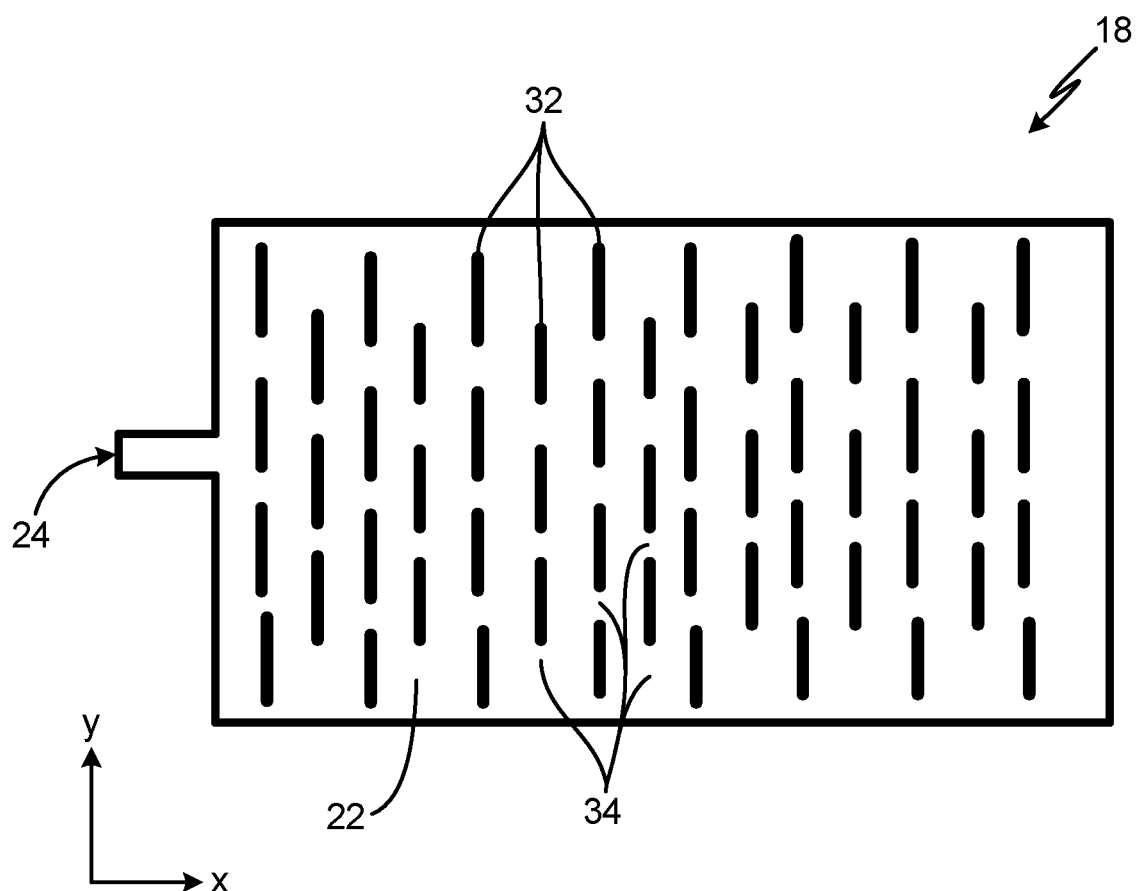
FIG. 3 is a cross-sectional view of a pressure vessel taken along line A-A in FIG. 2A, showing an embodiment of fire suppression elements.

FIG. 3 is a cross-sectional view of pressure vessel system 10 taken along line A-A in FIG. 2A, showing an embodiment of fire suppression elements 32. Barrier layer 18 includes fire suppression elements 32 and passageways 34. As discussed above, fire suppression elements 32 extend from container 12 to barrier wall 20. Fire suppression elements 32 have multiple benefits including i) decreasing the potential for combustion if a leak springs in container 12, ii) improving heat transfer between container 12 and barrier wall 20, and iii) providing structural support for container 12.

In the embodiment of FIG. 3, fire suppression elements 32 are elongated fins that extend lengthwise in a Y direction and that are spaced apart from each other in both the Y direction and an X direction to form passageways 34. The spacing of fire suppression elements 32 causes passageways 34 to be serpentine. Passageways 34 are fluidically connected to atmosphere by vent 24. The presence of fire suppression elements 32 in barrier space 22 reduces the risk of fire should a leak develop in container 12 by i) reducing the volume of air inside barrier layer 18 and ii) by creating serpentine passageways 34 that inhibit fresh air from being pulled into barrier layer 18 through vent 24 at a rate sufficient to sustain a fire.

The geometry of fire suppression elements 32 can be configured by modifying at least: i) the width of fire suppression elements 32, which as a result changes the dimensions of passageways 34; ii) the length of fire suppression elements 32; and/or iii) the density of fire suppression element 32 in barrier layer 18 (e.g., the volume of fire suppression element 32 vs. the volume of open passageways 34). In the present embodiment, fire suppression elements 32 are configured to make the passages 34 have a width, in the X direction, ranging from 0.0127 millimeters-6.35 millimeters (0.0005 inches-0.25 inches). To achieve the desired volume of passageways 34, fire suppression elements 32 can be made thicker or spaced closer to each other, as a result, making the area of passageways 34 smaller. The smaller fire suppression elements 32 define passageways 34, the more restriction to flow through barrier layer 18. Additionally, fire suppression elements 32 can be tapered to increase resistance to flow through passageways 34.

The length of fire suppression elements 32 directly affects the length of passageways 34. If the length, in the Y direction, of fire suppression elements 32 is decreased the length of passageways 34 will also be decreased proportionately. Reducing the length of fire suppression elements 32 will interrupt or disrupt passageways 34 creating more turns through passageways 34. Each interruption or disruption in passageways 34 increases the resistance to flow through passageways 34. Increasing the length, in the Y direction, of fire suppression elements 32 will increase the length of fire suppression elements 32. The increased length of passageways 34 will not be as effective at decreasing the likelihood of combustion, but the increased length of fire suppression elements 32 will provide more structural support to barrier layer 18.

The density of fire suppression elements 32 and passageways 34 can be configured to mitigate the likelihood of combustion. The density of fire suppression elements 32 and passageways 34 creates an inverse relationship between the likelihood of combustion and a direct relationship to the structural support and overall weight of pressure vessel system 10. The higher the density of fire suppression elements 32 and passageways 34, the lower the possibility of combustion, because the decreased air in passageways and the increased resistance to flow through barrier layer 18. However, the higher the density of fire suppression elements 32 and passageways 34, the more pressure vessel system 10 weighs. Therefore, the density of fire suppression elements 32 and passageways 34 are configured to minimize the possibility of combustion and minimize the mass of pressure vessel system 10. In the embodiment of FIG. 3, the spacing, in the X direction, between each of fire suppression elements 34 ranges from 0.0762 millimeters-6.35 millimeters (0.003 inches-0.25 inches).

The positioning of fire suppression elements 32 can further define passways 34. Changing the position of fire suppression elements 32 alters the relative distance to vent 24. The relationship between vent 24 and fire suppression element 34 provides a buffer between potential leaks and the reactive agents in the atmosphere. As discussed above, providing a buffer between potential leaks and the reactive agents of the atmosphere helps mitigate the likelihood of combustion. The positioning of fire suppression elements 32 will be discussed in greater detail below in reference to FIGS. 4A-F.

The structural makeup of fire suppression elements 32 can be configured to improve heat transfer between container 12 and barrier wall 20 (shown in FIG. 2A). As discussed above with reference to FIG. 2A, fire suppression elements 32 assist in increasing the heat transfer between heat exchanger 26 and heat exchanger 28 by providing thermal pathways that span barrier cavity 22. To further increase the heat transfer between heat exchanger 26 and heat exchanger 28, fire suppression elements 32 can be made from silver, copper, gold, aluminum, titanium, or any other suitable material with high thermal conductivity. Fire suppression elements 32 can be located in higher density to provide a higher number of thermal pathways to promote heat transfer from container 12. In contrast, if less heat transfer is desired, the density of heat transfer elements 32 can be decreased to limit heat transfer from container 12. Fire suppression elements 32 also increase the structural stability and durability of pressure vessel system 10. Fire suppression elements 32 protect pressure vessel system 10, and container 12, from damage due to vibrations, pressure impulses related to limited combustion, and general wear from the operating environment of pressure vessel 10 by providing load pathways between container 12 and barrier wall 20. These load pathways allow stress to shift from container 12 to barrier wall 20 during operation of pressure vessel system 10.

FIGS. 4A-4F disclose alternative embodiments of barrier layer 18 with design variations of fire suppression elements 32.

Figure 4A:
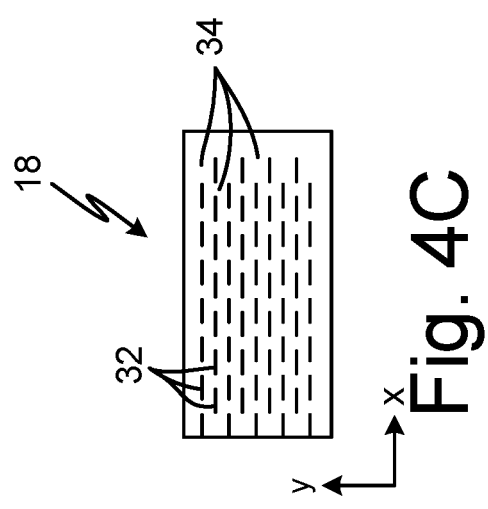
FIG. 4A is a cross-sectional view of another embodiment of a pressure vessel with fire suppression elements.

In FIG. 4A, fire suppression elements 32 are fins, which extend in the X direction and are spaced from one another in the Y direction. The configuration of fire suppression elements 32 in FIG. 4A provides increased heat transfer for pressure vessel 10. Additionally, the configuration of fire suppression elements 32 in FIG. 4A minimizes the weight of pressure vessel 10.

Figure 4B:
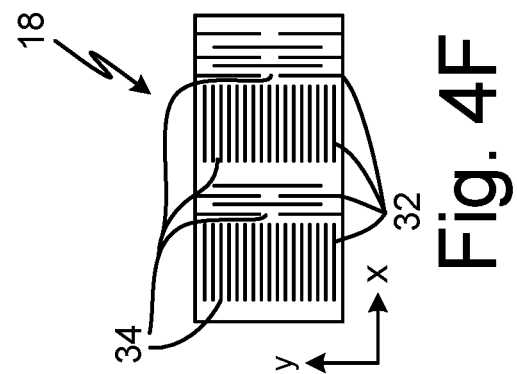
FIG. 4B is a cross-sectional view of another embodiment of a pressure vessel with fire suppression elements.

In FIG. 4B, fire suppression elements 32 are columnar in shape, having a length in the X direction and a width in the Y direction. The columnar shape of fire suppression elements 32 in FIG. 4B provides increased heat transfer capability and improved structural support. However, with the increase in width and the columnar shape of heat suppression elements 32, the overall weight of pressure vessel system 10 is greater.

Figure 4C:
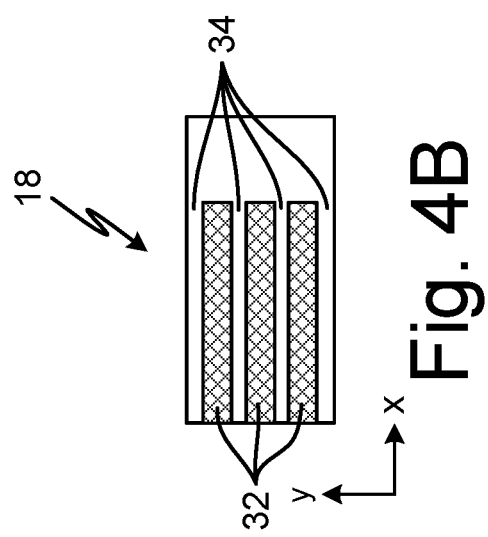
FIG. 4C is a cross-sectional view of another embodiment of a pressure vessel with fire suppression elements.

The configuration of fire suppression elements 32 in FIG. 4C are segmented fins oscillating in the X direction and offset from one another in the Y direction from one row to the next. The configuration of fire suppression elements 32 in FIG. 4C provides good heat transfer properties, good structural support, and improved fire suppression.

Figure 4D:
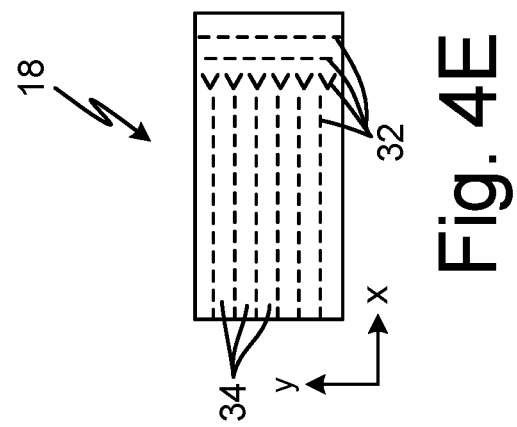
FIG. 4D is a cross-sectional view of another embodiment of a pressure vessel with fire suppression elements.

In FIG. 4D, fire suppression elements 32 start as segmented fins and shift to a less-than sign shape in the X direction. The configuration of fire suppression elements 32 in FIG. 4D provides excellent heat transfer properties, good structural support, and improved fire suppression.

Figure 4E:
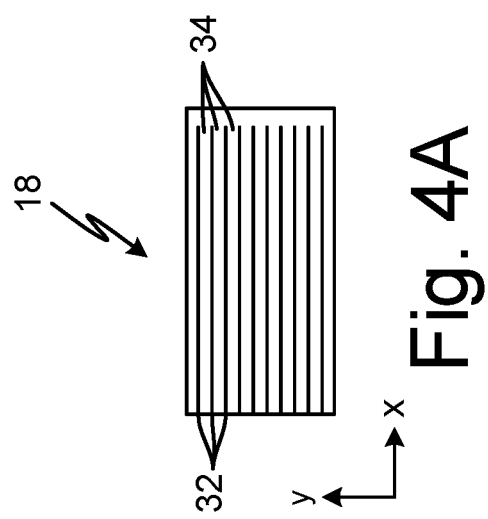
FIG. 4E is a cross-sectional view of another embodiment of a pressure vessel with fire suppression elements.

In FIG. 4E, fire suppression elements 32 begin as segmented fins extending in the X direction. In the X direction, fire suppression elements 32 shift to a less-than sign shape, and then shift to a segmented fin shape extending in the Y direction. The configuration of fire suppression elements 32 in FIG. 4E provides good heat transfer properties, good structural support, and good fire suppression.

Figure 4F:
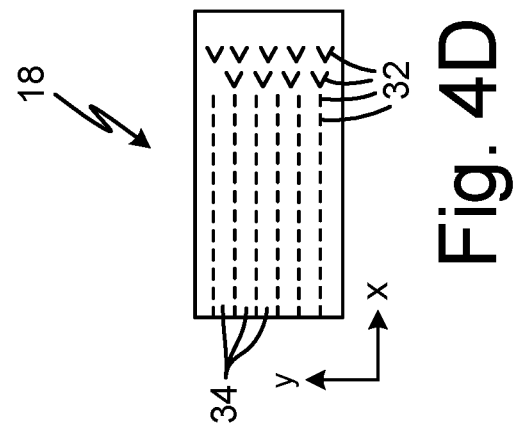
FIG. 4F is a cross-sectional view of another embodiment of a pressure vessel with fire suppression elements.

In FIG. 4F, fire suppression elements 32 begin fin-shaped with a length in the X direction and are spaced apart evenly from one another in the Y direction. Moving in the X direction, the fire suppression elements 32 are fin-shaped with a length extending in the Y direction and are spaced apart from one another evenly in the X direction. Continuing in the X direction, fire suppression elements 32 are fin-shaped and once again extending in the X direction. Further in the X direction, fire suppression elements 32 are fin-shaped and orientated once again with a length in the Y direction. The configuration of fire suppression elements 32 in FIG. 4F provides good heat transfer properties, good structural support, and good fire suppression.

The different designs of fire suppression elements 32 shown in FIGS. 4A-4F are not an exhaustive list of all possible designs of fire suppression elements 32. However, FIGS. 4A-4F provide examples of some different configurations of fire suppression elements 32 to improve heat transfer capabilities, improve structural support, and improve fire suppression capabilities in pressure vessel system 10. For example, barrier layer 18 could have one fire suppression element 32 that spirals around container 12, or fire suppression elements 32 could form a labyrinth.

Discussion of Possible Embodiments

The following are non-exclusive descriptions of possible embodiments of the present invention.

In one embodiment, a pressure vessel includes a first wall defining a container and a second wall surrounding the container defining a cavity between the first wall and the second wall. The pressure vessel also includes a vent in the second wall providing fluid communication between the cavity and an outside of the second wall and matter positioned within the cavity configured to prevent flame from propagating through the cavity while providing thermal conductivity between the first wall and the second wall.

The pressure vessel of the preceding paragraph can optionally include, additionally and/or alternatively, any one or more of the following features, configurations and/or additional components:

the matter forms barrier passages in the cavity;

the barrier passages further comprise: a width extending in a first direction; and a length extending in a second direction;

the width ranges from 0.0127 millimeters-6.35 millimeters (0.0005 inches-0.25 inches);

the barrier layer further comprises: a second matter in the barrier cavity, wherein the second matter extends from the first wall to the second wall;

the first matter comprises a first shape and the second matter comprises a second shape;

a plurality of matter alternate from the shape of the first matter to the shape of the second matter;

the pressure vessel is a heat exchanger;

the vent provides fluid communication with the atmosphere;

a check valve is connected to the vent; and/or the first wall, the second wall, and the matter are one continuous piece.

In another embodiment, a pressure vessel includes a first system. The first system includes a first container, a second container surrounding the first container, and a barrier space extending between the first container and the second container. The first system also includes a plurality of fire suppression elements extending between the first container and the second container, a vent, and a barrier passage. The barrier passage is defined by the plurality of fire suppression elements, and the barrier passage is fluidically connected to the vent.

The pressure vessel of the preceding paragraph can optionally include, additionally and/or alternatively, any one or more of the following features, configurations and/or additional components:

A second system includes a third container, a fourth container surrounding the third container, and a second barrier space extending between the third container and the fourth container. The second system also includes a second plurality of fire suppression elements, where the second plurality of fire suppression elements extend from the third container to the fourth container, a second vent, and a second barrier passage. The second barrier passage is defined by the second plurality of fire suppression elements and the second barrier passage is fluidically connected to the second vent;

a central drain port fluidically coupled to the first vent and the second vent;

the central drain port comprises a leak detection device;

spacing between each fire suppression element of the plurality of fire suppression element ranges from 0.0762 millimeters-6.35 millimeters (0.003 inches-0.25 inches);

the first pressure vessel and the second pressure vessel are each heat exchangers; and/or the plurality of fire suppression elements is made from a material with a high thermal conductivity.

In another embodiment, a method of making includes forming a first wall, where the first wall defines a container, forming fire suppression elements on the surface of the first wall, and forming a second wall surrounding the container and defining a cavity between the first wall and the second wall. The fire suppression elements are configured to prevent flame from propagating through the cavity while providing thermal conductivity between the first wall and the second wall.

The method of making of the preceding paragraph can optionally include, additionally and/or alternatively, any one or more of the following features, configurations and/or additional components:

additively manufacturing the first wall, the second wall, and the fire suppression elements as one continuous piece.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pressure vessel comprising:
   a first system comprising:
      a first container;
      a second container surrounding the first container;
      a first barrier space extending between the first container and the second container,
      a first plurality of fire suppression elements, wherein the plurality of fire suppression elements extends from the first container to the second container;
      a vent; and
      a first barrier passage, wherein the first barrier passage is defined by the plurality of fire suppression elements, and wherein the barrier passage is fluidically connected to the vent;
   a second system comprising:
      a third container;
      a fourth container surrounding the third container;
      a second barrier space extending between the third container and the fourth container;
      a second plurality of fire suppression elements, wherein the second plurality of fire suppression elements extend from the third container to the fourth container;
      a second vent; and
      a second barrier passage, wherein the second barrier passage is defied by the second plurality of fire suppression elements, and wherein the second barrier passage is fluidically connected to the second vent;
   a central drain port fluidically coupled to the first vent and the second vent; and
   wherein the central drain port provides fluid communication with the atmosphere.

2. The pressure vessel from claim 1, wherein the first and second barrier passages further comprise:
   a width extending in a first direction; and
   a length extending in a second direction.

3. The pressure vessel from claim 2, wherein the width ranges from 0.0127 millimeters-6.35 millimeters (0.0005 inches-0.25 inches).

4. The pressure vessel of claim 1, wherein the first plurality of fire suppression elements includes fire suppression elements having a first shape and fire suppression elements having a second shape.

5. The pressure vessel of claim 4, wherein the first plurality of fire suppression elements alternate from the first shape to the second shape along the first barrier passage.

6. The pressure vessel of claim 1, wherein the second plurality of fire suppression elements includes fire suppression elements having a first shape and fire suppression elements having a second shape.

7. The pressure vessel of claim 6, wherein the second plurality of fire suppression elements alternate from the first shape to the second shape along the first barrier passage.

8. The pressure vessel from claim 1, wherein a check valve is connected to the drain port.

9. The pressure vessel from claim 1, wherein the first container, the second container, and the first plurality of fire suppression elements are one continuous piece.

10. The pressure vessel of claim 1, wherein the third container, the fourth container, and the second plurality of fire suppression elements are one continuous piece.

11. The pressure vessel of claim 1, wherein the first system and the second system are each heat exchangers.

12. A method of making the pressure vessel of claim 1, the method comprising:
- forming the first container;
- forming the first fire suppression elements on the surface of the first container; and
- forming the second container surrounding the first container and defining the barrier space between the first container and the second container.

13. The method of making of claim 12, further comprising:
- additively manufacturing the first container, the second container, and the first plurality of fire suppression elements as one continuous piece.

* * * * *